US010503840B2

(12) United States Patent
Nysetvold et al.

(10) Patent No.: US 10,503,840 B2
(45) Date of Patent: Dec. 10, 2019

(54) SYSTEM AND METHODS FOR MULTI-USER CAX EDITING DATA CONSISTENCY

(71) Applicant: Brigham Young University, Provo, UT (US)

(72) Inventors: Thomas Trevor Nysetvold, The Woodlands, TX (US); Charles Gregory Jensen, Provo, UT (US); Joshua John Bennett, Cottonwood Heights, UT (US); Glen Phelps, Midvale, UT (US); Ammon Ikaika No Kapono Hepworth, Provo, UT (US)

(73) Assignee: BRIGHAM YOUNG UNIVERSITY, Provo, UT (US)

( * ) Notice: Subject to any disclaimer, the term of this patent is extended or adjusted under 35 U.S.C. 154(b) by 1014 days.

(21) Appl. No.: 14/185,823

(22) Filed: Feb. 20, 2014

(65) Prior Publication Data
US 2014/0236550 A1 Aug. 21, 2014

Related U.S. Application Data

(60) Provisional application No. 61/766,965, filed on Feb. 20, 2013.

(51) Int. Cl.
*G06F 7/60* (2006.01)
*G06F 17/10* (2006.01)
*G06F 17/50* (2006.01)

(52) U.S. Cl.
CPC .......... *G06F 17/50* (2013.01); *G06F 2217/04* (2013.01)

(58) Field of Classification Search
None
See application file for complete search history.

(56) References Cited

U.S. PATENT DOCUMENTS

2003/0149699 A1* 8/2003 Tsao ........................ G06F 8/71
2006/0085789 A1* 4/2006 Laborczfalvi ........... G06F 9/468
718/100

(Continued)

FOREIGN PATENT DOCUMENTS

WO 2012058604 A2 5/2012

OTHER PUBLICATIONS

Yang, Jeongsam et al., "Repairing CAD Model Errors Based on the Design History", Feb. 25, 2006, Computer-Aided Design 38, Elsevier Ltd.*

(Continued)

*Primary Examiner* — Cedric Johnson
(74) *Attorney, Agent, or Firm* — Kunzler Bean & Adamson

(57) ABSTRACT

A multi-user CAx editing system may comprise a plurality of editing clients. The editing clients may be configured to maintain data consistency for geometric elements created within each local instance of a model of an engineering object. For example, each of the plurality of editing clients may include a synchronization module configured to identify one or more distinguishing parameters for each locally created geometric element and generate a unique persistent label for the geometric element, and communicate the unique persistent label and the distinguishing parameters to other editing clients. The communication may occur via a collaborative editing server. The other editing clients may find a geometric element within their local instance of the model that matches the distinguishing parameters and associate the unique persistent label with that geometric element. Subsequent references to the geometric element may be made by referring to the unique persistent label.

20 Claims, 8 Drawing Sheets

(56) References Cited

U.S. PATENT DOCUMENTS

| | | | | |
|---|---|---|---|---|
| 2008/0195405 | A1* | 8/2008 | Lopez | G06F 17/5004 705/1.1 |
| 2010/0042377 | A1* | 2/2010 | Seroussi | G06F 17/5004 703/1 |
| 2012/0317497 | A1* | 12/2012 | Red | G06F 17/50 715/751 |
| 2013/0080122 | A1* | 3/2013 | Bumbalough | G06F 17/5004 703/1 |

OTHER PUBLICATIONS

Balachandran, M. et al., "A Knowledge-Based Approach to the Automatic Verification of Designs from CAD Databases", 1991, Artificial Intelligence in Design'91. (Year: 1991).*

Chen, Chun et al., "An Operation-Based Exchange Mechanism in Heterogeneous CAD Collaboration", May 2005, The 9th International Conference on Computer Supported Cooperative Work in Design Proceedings. (Year: 2005).*

Moncur, Robert Aaron, "Data Consistency and Conflict Avoidance in a Multi-User CAx Environment", Jul. 19, 2012, Brigham Young University. (Year: 2012).*

Moncur, Robert A. et al., "Data Consistency and Conflict Avoidance in a Multi-User CAx Environment", 2013, Computer-Aided Design and Applications. (Year: 2013).*

PCT/US2014/017502, International Preliminary Report on Patentability, dated Sep. 3, 2015.

PCT/US2014/017502, Intentional Search Report, dated Jul. 10, 2014.

* cited by examiner

SYSTEM AND METHODS FOR MULTI-USER CAX EDITING DATA CONSISTENCY

RELATED APPLICATIONS

This application claims priority to U.S. provisional application 61/766,965 entitled "Scalable Integration of Commercial File Types in Multi-User CAD" and filed on 20 Feb. 2013. The foregoing application is incorporated herein by reference.

BACKGROUND OF THE INVENTION

Field of the Invention

The claimed invention relates to computer aided technologies (CAx) such as computer aided design, engineering, analysis and manufacture in general and apparatus, systems, means, and methods for multi-user CAx editing in particular.

Description of the Related Art

Large design and engineering projects require coordination of the efforts of many designers or engineers. Designers and engineers may have various CAx tools that they have experience with, have been trained to use, or simply prefer. Existing CAx data may have been created using still other CAx tools. Each of these CAx tools may have incompatible file formats.

Existing CAx systems, however, are not well-suited to collaborative design and editing. For example, data files that are shared among several designers and edited by them may create editing conflicts and data inconsistencies that often result in data loss and/or corruption.

Accordingly, the present invention identifies and addresses a need for improved systems and methods for multi-user CAx editing data consistency.

BRIEF SUMMARY OF THE INVENTION

The embodiments disclosed herein have been developed in response to the present state of the art, and in particular, in response to the problems and needs in the art that have not yet been fully solved by currently available multi-user CAx editing systems and methods. Accordingly, the claimed inventions have been developed to provide methods and systems for multi-user CAx editing data consistency that overcome shortcomings in the art.

In one example, a multi-user CAx editing system includes a plurality of editing clients. The editing clients may be configured to maintain data consistency for geometric elements created within each local instance of a model of an engineering object. For example, each of the plurality of editing clients may include a synchronization module configured to identify one or more distinguishing parameters for each locally created geometric element and generate a unique persistent label for the geometric element, and communicate the unique persistent label and the distinguishing parameters to other editing clients. The other editing clients may find a geometric element within their local instance of the model that matches the distinguishing parameters and associate the unique persistent label with that geometric element. Subsequent references to the geometric element may be made by referring to the unique persistent label. Corresponding methods are also disclosed herein.

It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
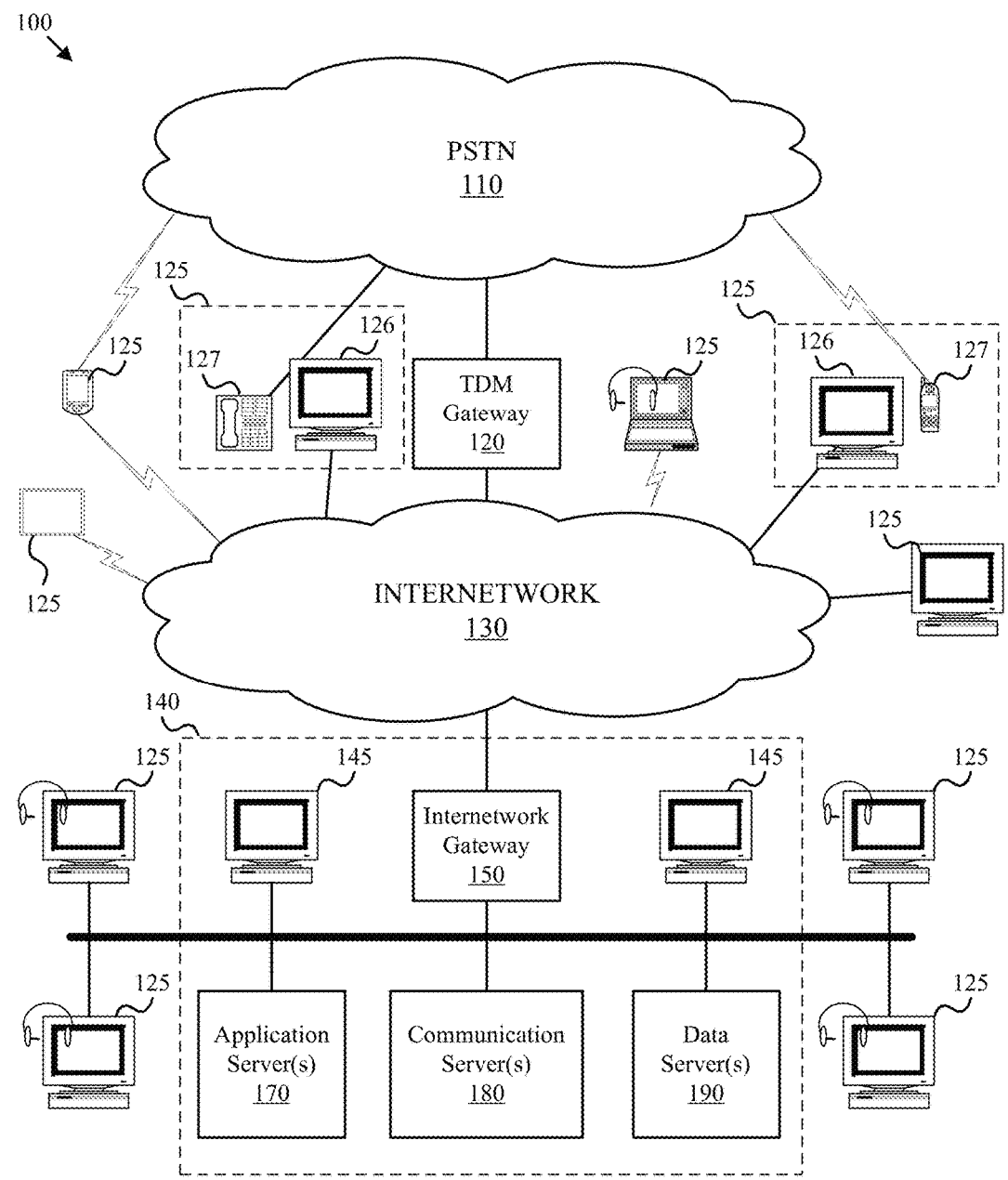
FIG. 1 is a block diagram of one example of a computing and communications infrastructure.

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a Bernoulli drive, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram of one example of a computing and communications infrastructure 100 that is consistent with one or more embodiments of the claimed invention. As depicted, the infrastructure 100 includes various systems, subsystems, and networks such as a public switched telephone network (PSTN) 110, a TDM gateway 120 connecting the PSTN to an inter-network 130, a variety of workstations 125, a data center 140 with administrative terminals 145, an inter-network gateway 150 connecting a local area network to the inter-network 130, and various servers such as application servers 170, communication servers 180, and data servers 190. The infrastructure 100 is one example of components that can be operably interconnected to provide an infrastructure for a computer-aided design, computer-aided engineering, or computer-aided manufacturing (CAx) system that includes a collaborative CAx editing system.

Each workstation 125 may include a separate computing device 126 and a communications device 127 or the computing device and communications device may integrated into the workstation 125. Examples of the communications device 127 include a phone, a VOIP device, an instant messaging device, a texting device, a browsing device, and the like. The computing devices 126 may enable graphical view selection. The communications devices 127 may enable users to communicate with other CAx system users.

The inter-network 130 may facilitate electronic communications between the various workstations and servers. In one embodiment, the inter-network 130 is the internet. In another embodiment, the inter-network 130 is a virtual private network (VPN).

Various servers such as blade servers within the data center 140 function cooperatively to facilitate concurrent collaborative editing of CAx models by local and remote users. For example, the application servers 170 may provide one or more CAx applications to the local and remote users. Some users may have the CAx applications installed on their local computing devices 126. Examples of CAx applications include Siemens NX, MSC Nastran, Dessault Systems CATIA and Solidworks, ANSYS, and the like.

The communication servers 180 may facilitate communications between the users through various channels or services such as VOIP services, email services, instant messaging services, short message services, and text messaging services. The workstations 125 may leverage such services for user to user communications via the communication servers 180 or via other available service platforms.

The data servers 190 or the like may store CAx models within various model files or records. The data servers may replicate copies of the models for use by various users. Some users may have a local copy of a model. As described herein, instead of requiring a particular user to assume control of a model file or record, updates to the model may be coordinated by one or more CAx applications including client versions, server versions, and cloud versions of such applications.

Figure 2:
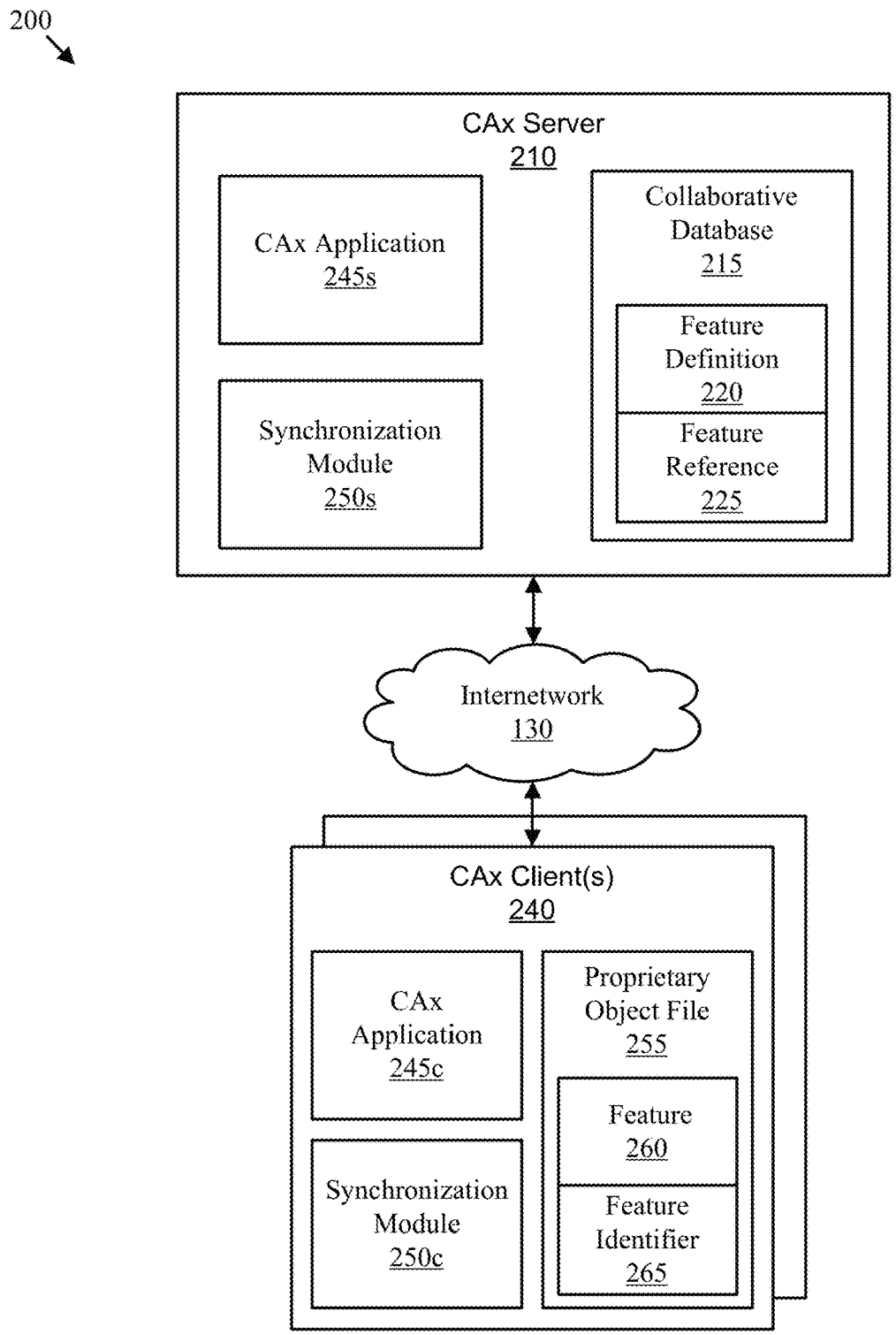
FIG. 2 is a schematic diagram illustrating one embodiment of a collaborative CAx editing system.

FIG. 2 is a block diagram of one example of a collaborative CAx editing system 200 that is consistent with one or more embodiments of the claimed invention. As depicted, and as will be explained in greater detail below, the collaborative CAx editing system 200 may include one or more CAx clients 240 with at least one processor that may execute a proprietary CAx application 245 (represented as 245s and 245c) and associated modules and enable editing of a proprietary representation of an engineering object by a user.

The collaborative CAx editing system 200 may also include a collaborative CAx server 210 that may store an operations log of the engineering object. Collaborative CAx editing system 200 may also include a synchronization module 250 (represented as 250s and 250) that may detect creation of a feature 260 of the engineering object within the proprietary CAx application 245 and insert a feature identifier 265 (or, for example, see synchronized feature identifier 445 with respect to FIG. 4) corresponding to the feature within the proprietary representation of the engineering object. The feature identifier 265 may correspond to, or be identical to, the feature reference 225 (or, in an embodiment associated with FIG. 4, correspond to a proprietary feature identifier 425).

As illustrated in FIG. 2, collaborative CAx editing system 200 may also include one or more data stores, such as proprietary object file 255 or collaborative database 215. In one embodiment, proprietary object file 255 may be configured to store a proprietary representation of an engineering object. Collaborative database 215 may be configured to store an operations log of the engineering object. Proprietary object file 255 and collaborative database 215 may represent portions of a single database or computing device or a plurality of databases or computing devices. For example, collaborative database 215 may represent portions of the computing and communications infrastructure 100 in FIG. 1.

Each of the modules may reside on a single computing device (i.e. node) or be collaboratively partitioned onto multiple devices or nodes. For example, in the depicted embodiment the CAx application 245 is partitioned into a CAx application client 245c and a CAx application service 245s. Similarly, the synchronization module 250 is partitioned into a client module 250c and a server module 250s. The modules may be primarily or wholly comprised of software codes and associated data that are executed and processed by a digital processing apparatus such as a computer to provide the specified functionality.

Figure 3:
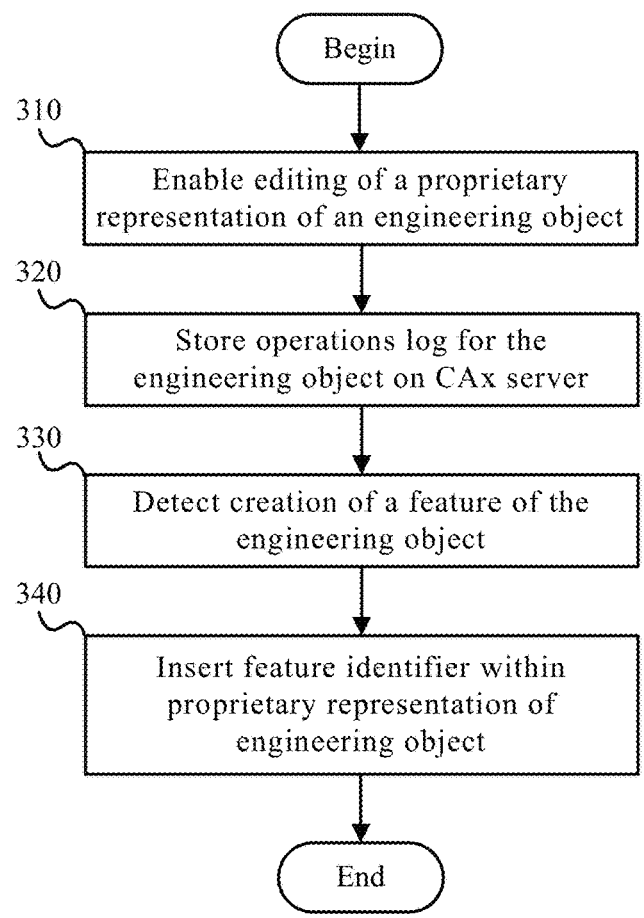
FIG. 3 is a flowchart diagram of one example of a collaborative CAx editing method.

FIG. 3 is a flow diagram of a collaborative CAx editing method 300. The steps (i.e., operations) shown in FIG. 3 may be performed by any suitable computer-executable code and/or computing system and in some cases need not be executed sequentially or in the depicted order. In some embodiments, the steps shown in FIG. 3 may be performed by one or more components of computing and communications infrastructure 100 in FIG. 1, system 200 in FIG. 2, and/or system 400 in FIG. 4.

As illustrated in FIG. 3, at step 310 one or more of the systems described herein may execute a proprietary CAx application and enable editing of a proprietary representation of an engineering object by a user. For example, at step 310 CAx client 240 may, as part of computing device 200 in FIG. 2, execute CAx application 245 and enable editing of a proprietary representation of an engineering object by a user. CAx application 245 may store the proprietary representation of the engineering object in proprietary object file 255. The proprietary representation may include one or more features of the engineering object, such as feature 260.

As used herein, the phrase "engineering object" generally refers to a conceptual design produced to show the look or function of an object before it is built or made. The design may be incorporated in representations such as plans, drawings, diagrams, schematics, blueprints, sketches, maps, or models. The design may include one or more "features," i.e., distinctive CAx attributes that may be represented by one or more geometries or parameters. Examples of features include operations or modifications conducted on geometric elements and their associated parameters such as the shape, dimensions, composition, material properties and tolerances of an object or portion of an object, the mesh size and required accuracy for simulations, the path and tolerances for a manufacturing tool, and any other attribute that may affect the performance of a product and the manufacture thereof. For example, a feature may define a hole created in a solid geometry or a 3D extrusion of a 2D geometry.

As used herein, the phrase "proprietary representation" or "local model" generally refers to a data format or object file associated with a CAx application that may be, but is not required to be, proprietary. A proprietary representation of an engineering object may be vendor specific and often cannot be directly edited by a CAx application other than those available from the vendor or licensed by the vendor. Typically, a conversion process is required for a CAx application from another vendor to edit the engineering object. The conversion process may result in the loss of data.

At step 320 one or more of the systems described herein may store an operations log for the engineering object on a collaborative CAx server. For example, at step 320 collaborative CAx server 210 may, as part of computing device 200 in FIG. 2, store an operations log of the engineering object on a collaborative CAx server 210. The operations log may be stored in a collaborative database 215, and may include one or more feature definitions, such as feature definition 220.

As used herein, the phrase "operations log" generally refers to a log of CAx operations that may or may not be associated with a single proprietary CAx application. For example, the operations log may be a vendor-neutral log of feature definitions that facilitates collaborate editing between various proprietary CAx applications.

Collaborative CAx server 210 may store an operations log of the engineering object in various ways. In one embodiment, the operations log of the engineering object comprises a log of sequentially-generated feature definitions. The engineering object may be reconstructed within various CAx applications by regenerating the features comprising the engineering object in sequence. The feature definitions within the operations log may be readily translatable to editing commands within each CAx application by a synchronization module 250 associated therewith.

The operations log of the engineering object may include references to features within the proprietary representation of the engineering object. For example, as depicted in FIG. 2, feature definition 220, corresponding to feature 260 and to feature identifier 265, may have an associated feature reference 225 associating feature definition 220 with feature 260. In some embodiments, the feature identifier 265, corresponds directly to the feature reference 225. In one embodiment, the feature identifier 265 and the feature reference 225 are identical. Synchronization module 250 may use feature reference 225 to identify the corresponding feature 260 within proprietary object file 255 via the feature identifier 265. In one embodiment, feature reference 225 is a globally-unique identifier (GUID) associated with feature 260.

In one embodiment, the proprietary representation of the engineering object corresponds to a point-in-time within the log of sequentially-generated feature definitions. The point in time may correspond to a snapshot or revision marker within the log. In a collaborative CAx editing environment, editing of the engineering object may take place while a client is offline. The sequentially-generated feature definitions may continue to be created in the operations log of the engineering object. When the client reconnects with the operations log of the engineering object, subsequently-generated feature definitions created after the point-in-time are applied to the proprietary representation to synchronize the proprietary representation with the operations log.

Returning to FIG. 3, at step 330 one or more of the systems described herein may detect creation of a feature of the engineering object within the proprietary CAx application. For example, at step 330 collaborative CAx synchronization module 250 may, as part of CAx client 240 in FIG. 2, detect creation of a feature of the engineering object within the proprietary CAx application. For example, collaborative CAx synchronization module 250 may detect creating of feature 260 in proprietary object file 255.

The collaborative CAx synchronization module 250 may detect creation of a feature of the engineering object within the proprietary CAx application in any suitable manner. In one embodiment, the collaborative CAx synchronization module is a plugin for the CAx application, and detects creation of a feature of the engineering object using an application programming interface (API) provided by the CAx application to permit additional functions to execute when a feature is created.

At step 340 of FIG. 3, one or more of the systems described herein may insert a feature identifier corresponding to the feature within the proprietary representation of the engineering object. For example, at step 340 synchronization module 250 may, as part of CAx client 240 in FIG. 2, insert feature identifier 265 corresponding to feature 260 within the proprietary representation of the engineering object stored in proprietary object file 255.

As used herein, the phrase "feature identifier" generally refers to a data item that relates a feature in a possibly proprietary object file or local model to a feature definition in a collaborative database. In one embodiment, the feature identifier is the index of the feature definition record in the collaborative database.

In one embodiment, the feature identifier is stored in a parameter for the feature within the proprietary representation of the engineering object. By storing the feature identifier within the proprietary representation of the engineering object, the relationship between the feature and the corresponding feature definition within the operations log is persistent between editing sessions on the CAx client. The feature identifier may be a globally unique identifier. In some embodiments, the feature identifier is represented in a text format to facilitate storage and retrieval within various CAx applications.

Figure 4:
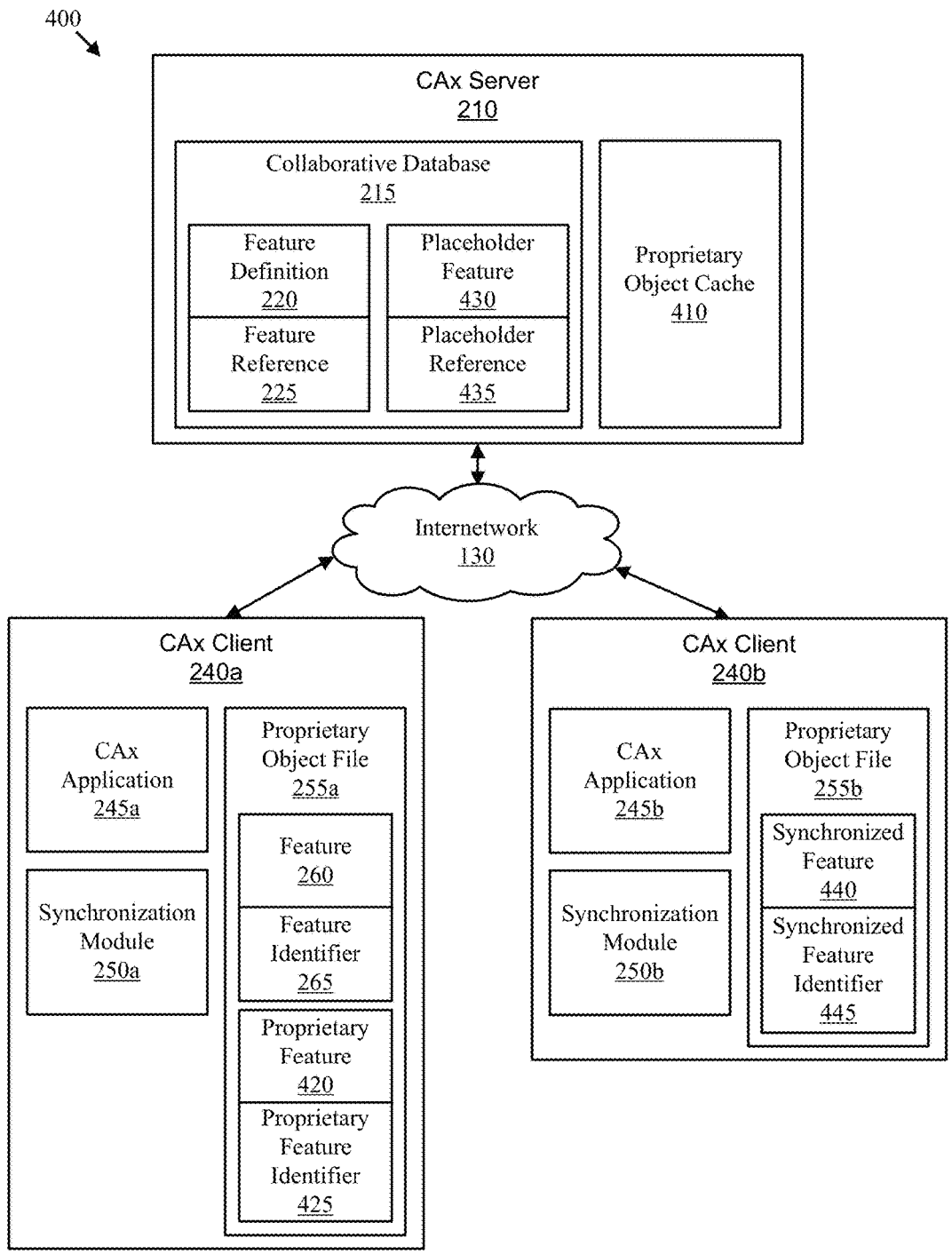
FIG. 4 is a schematic diagram of one example of a collaborative CAx editing system.

FIG. 4 is a schematic diagram of one example of a collaborative CAx editing system 400 that is consistent with one or more embodiments of the claimed invention. In addition to the internetwork 130 of the computing and communications infrastructure 100 of FIG. 1 and modules of the collaborative CAx editing system 200 of FIG. 2, collaborative CAx editing system 400 includes a second CAx client. Corresponding modules of the two CAx clients 240 are appended with reference letters 'a' and 'b.'

In one embodiment, the proprietary representation and the operations log of the engineering object may be cached by the collaborative CAx server. For example, as part of collaborative CAx editing system 400 in FIG. 4, CAx server 210 may cache the proprietary representation of the engineering object in proprietary object cache 410. Regenerating a proprietary representation of an engineering object from sequentially-generated feature definitions in an operations log of the object may be a computationally-intensive and time-consuming process. Caching the proprietary representation of the engineering object on the CAx server with the operations log accelerates the loading of the engineering object on a CAx client on which the proprietary representation is usable by the CAx client and has not yet been loaded into memory (such as following a system crash of the CAx client, or when a new CAx client is added to the collaborative editing system).

In one embodiment, the proprietary representation of the engineering object may be provided to another (a second) CAx client. When the second CAx client adds or changes a feature in the proprietary representation, an instance of the collaborative CAx synchronization module corresponding to the second client may communicate the feature identifier and a corresponding feature definition to the CAx server. The collaborative CAx synchronization module (associated with the first CAx client) may then receive a feature identifier and the feature definition corresponding to the feature created the second CAx client and create a corresponding local feature. For example, as part of collaborative CAx editing system 400, synchronization module 250b on CAx client 240b may create feature definition 220 in collaborative database 215 on CAx server 210. CAx server 210 may notify synchronization module 250a on CAx client 240a of the new feature in the collaborative database 215. Synchronization module 250a may then create synchronized feature 440 in proprietary object file 255a on CAx client 240a, corresponding to feature 260 in proprietary object file 255b on CAx client 240b.

In some embodiments, the CAx synchronization module may initiate insertion of a placeholder feature and corresponding feature reference within the operations log of the engineering object for features not directly supported by the operations log of the engineering object. For example, as depicted in collaborative editing system 400 in FIG. 4, feature 420 may be created in proprietary object file 255a on CAx client 240a. Synchronization module 250a may initiate creation of placeholder feature 430 and associated placeholder reference 435 in collaborative database 215 on CAx server 210. Features represented by a placeholder may not be editable by another CAx application, but the placeholder reference 435 maintains an association between the database record for placeholder feature 430 and the proprietary representation of the data in the proprietary object file 255a. Placeholder features may be referenced by other features. For example, a sheet body that could not be created or edited in collaborative database 215 may be represented by a placeholder feature and referenced by a split body feature.

As explained above, the collaborative CAx system may associate features in a proprietary representation of an engineering object with corresponding feature definitions in an operations log of the engineering object. A synchronization module, which may be a plug-in to a CAx application executing on a CAx client, may synchronize features between the proprietary and operations logs of the engineering object. As new features are created and edited on one CAx client and synchronized to the vendor-neutral database, synchronization modules on other CAx clients may synchronize the features from the vendor-neutral database to local copies of the proprietary representation of the engineering object.

The collaborative CAx editing system may maintain identifiers and references associating the proprietary and operations log representations of features of the engineering object in non-transitory storage, to prevent the loss of data in the event of system failure of either a CAx client or the CAx server. Caching the proprietary representation of the engineering object in a proprietary object cache on the CAx server may facilitate faster recovery from the system failure of a CAx client.

The proprietary representation of an engineering object may be a "checkpoint" or point-in-time within a sequence of feature definitions created in operations log. The synchronization module may bring the proprietary representation "up to date" by creating features in the proprietary representation that were created in the operations log subsequent to the point-in-time represented by the proprietary representation.

Applicants have observed that the creation of features on various CAx editing clients may result in the creation of dependent geometric elements in an inconsistent order. Consequently, operations or features that attempt to operate on a geometric element may operate on a different geometric element resulting in inconsistent features on various clients. In response thereto, FIGS. 5-8 depict several CAx data consistency methods that may be conducted in conjunction with the collaborative CAx editing systems 200 and 400, or the like, including collaborative CAx editing systems described in commonly assigned co-pending U.S. patent application Ser. No. 14/298,232 entitled "SYSTEM, METHOD, AND APPARATUS FOR COLLABORATIVE CAX EDITING" filed on 25 Nov. 2013 and Ser. No. 13/790,556 entitled "Multi-User Decomposition of Design Space Models" filed on 8 Mar. 2013. Each of these applications is incorporated herein by reference in their entirety. The data consistency methods depicted in FIGS. 5-8 and described herein prevent inconsistent references to geometric elements and the resulting corruption or loss of data in shared CAx data files and databases such as the collaborative database 215 and the proprietary object files 255.

Figure 5:
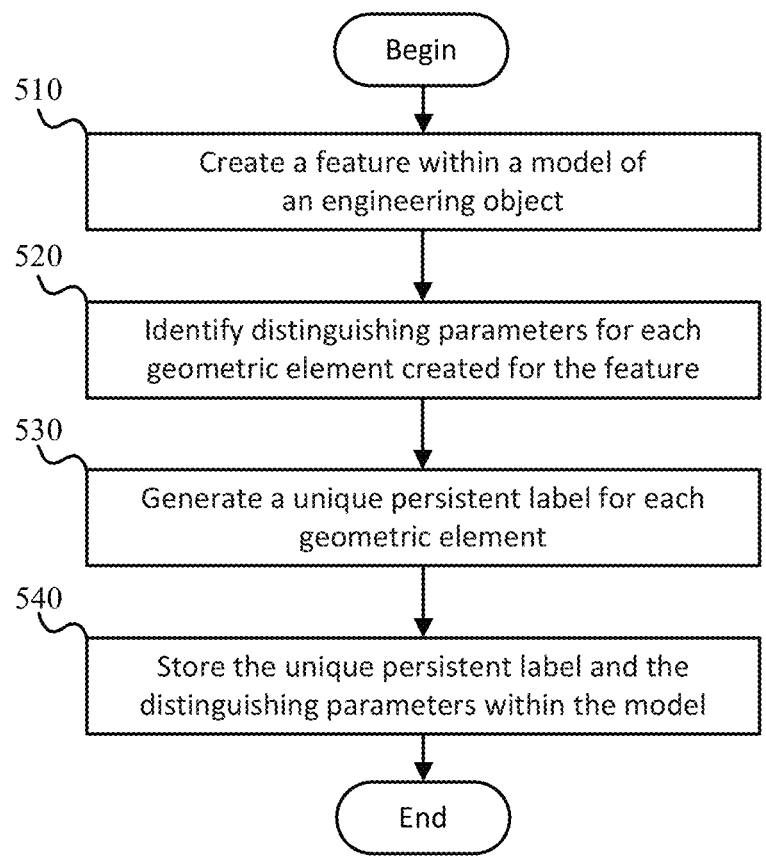
FIG. 5 is a flowchart depicting one embodiment of a data consistency method suitable for multi-user CAx editing environments.

FIG. 5 is a flowchart depicting one embodiment of a data consistency method 500 suitable for multi-user CAx editing environments. As depicted, the data consistency method 500 includes creating 510 a feature within a model of an engineering object, identifying 520 distinguishing parameters for each geometric element created for the feature, generating 530 a unique persistent label for each geometric element, and storing 540 the unique persistent label and the distinguishing parameters within the model. The data consistency method 500 enables maintaining a consistent model of an engineering object across multiple CAX editing clients including CAX editing clients having proprietary storage formats such as CAX editing clients from different vendors.

Creating 510 a feature within a model of an engineering object may include detecting that the user has completed the creation of a feature within the model using the user interface to the CAx software. In one embodiment, the detection is accomplished in a software module that runs on the same client as the CAx software. For example, the software module may be a CAx plugin module. In another embodiment, the detection is accomplished by a software module that runs on a collaborative server or the like. The feature may be created according to the method of FIG. 3 or a similar method.

Identifying 520 distinguishing parameters for each geometric element created for the feature may include extracting from each geometric element a set of parameters, such as end point coordinates in the case of a line segment, center points and radius in the case of a circle of sphere, and a set of points on a surface in the case of a free-form surface, a distance in the case of a dimensional length, and so on. The parameters may be selected so that an identical geometric element can be positively and uniquely identified by the selected parameters despite having different representations within the local models managed by various CAX editing clients. In one embodiment, the parameters are stored in a data structure that is specific to the type of geometric element.

Generating 530 a unique persistent label for each geometric element may include creating a label that has not been used previously for any other geometric elements that make up the engineering model. In one embodiment, the label comprises a random string of characters, in another embodiment, the label has concatenated information such as the username of the user operating the CAx software on the client, the type of geometric element, and an ascending numeric value.

Storing 540 the unique persistent label and the distinguishing parameters within the model may include using a plugin running on the client to store the label and parameters within the model of the engineering object as an auxiliary information field. In another embodiment, the label and parameters are stored in a database on the client external to the CAx software. The label and parameters may also be stored in a centrally managed datastore on a collaborative server.

Figure 6:
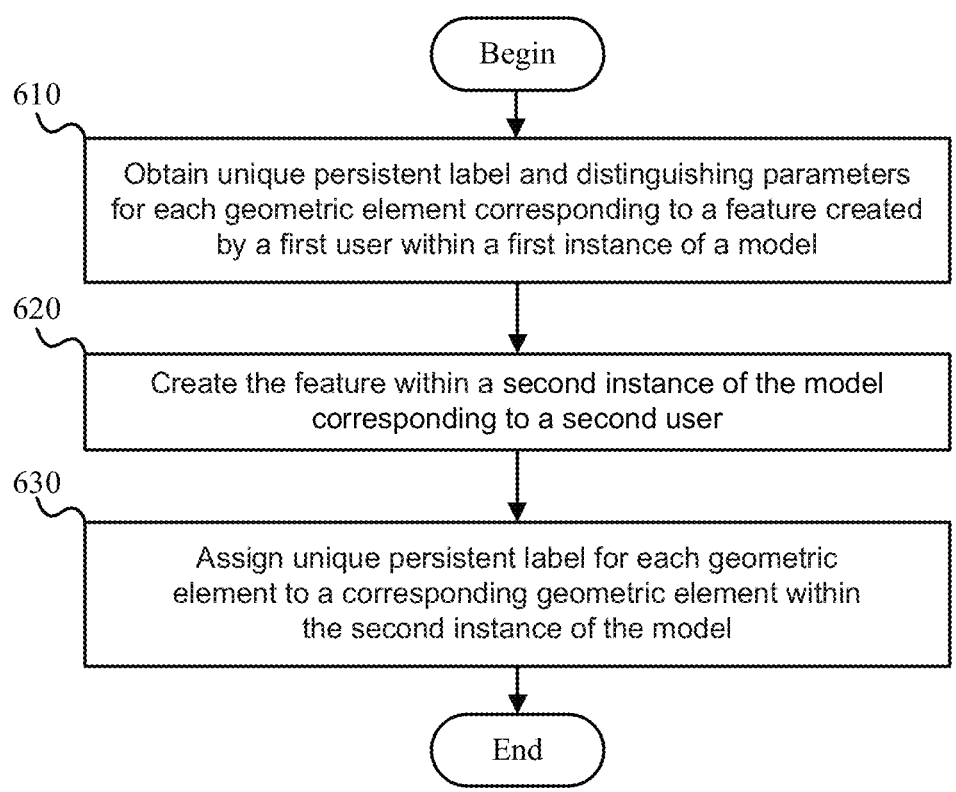
FIG. 6 is a flowchart depicting one embodiment of a geometric element labeling method.

FIG. 6 is a flowchart depicting one embodiment of a geometric element labeling method 600. As depicted, the labeling method 600 includes obtaining 610 a unique persistent label and one or more distinguishing parameters for each geometric element corresponding to a feature created by a first user within a first instance of a model, creating 620 the feature within a second instance of the model corresponding to a second user, and assigning 630 the unique persistent label for each geometric element to a corresponding geometric element within the second instance of the model. The unique persistent label and the distinguishing parameters may correspond to a feature. The feature and related information including the unique persistent label and the distinguishing parameters may delineated in a feature descriptor corresponding to the feature created by the first user. In one embodiment, the feature descriptor is communicated from a client corresponding to the first user and communicated to a local client corresponding to the second user via a collaborative server or the like. The labeling method 600 enables consistent labeling for geometric elements across multiple clients in a multi-user CAX editing environment. By maintaining consistent labeling, feature consistency may be maintained across proprietary storage formats.

Obtaining 610 a unique persistent label and distinguishing parameters for each geometric element corresponding to a feature created by a first user within a first instance of a model may include receiving an electronic communication that includes the unique persistent label and distinguishing parameters from client associated with the first instance of the model. In one embodiment, the communication is facilitated by a collaborative server. In another embodiment, the communication is managed by the client where the first instance of the model resides.

Creating 620 the feature within a second instance of the model corresponding to a second user may include instructing a synchronization module to create a feature that matches the feature on the first client. In one embodiment, the synchronization module is a plugin for a CAx editing client that interfaces to the CAx editing client via an API. In another embodiment, the synchronization module is integral to the CAx editing application. The module may receive the labels and distinguishing parameters associated with a feature and match any geometric elements that already exist in a local (i.e. second) instance of the model. The module may also initiate creation of the feature, using the feature type (from the feature definition information) and any existing geometric elements identified during the matching process.

Assigning 630 unique persistent label for each geometric element to a corresponding geometric element within the second instance of the model may include generating a local set of distinguishing parameters for each new geometric element created in the process of creating the feature, and matching them with the received distinguishing parameters, and assigning the label associated with the distinguishing parameters to the corresponding geometric element. In one embodiment, the label is stored within the electronic model.

Figure 7:
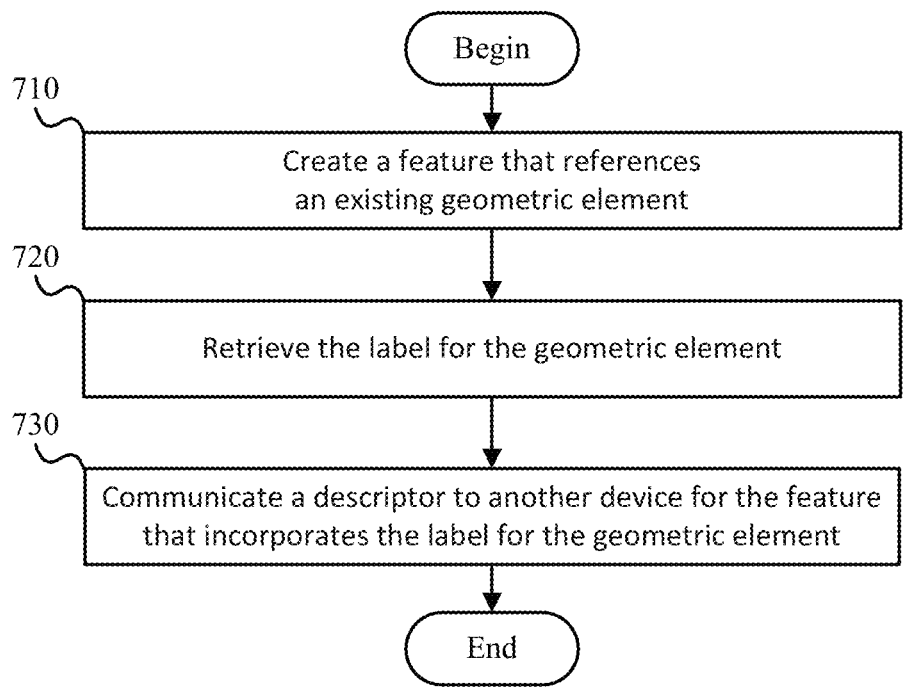
FIGS. 7 and 8 are flowcharts depicting complementary feature duplication methods for a multi-user CAx editing environment.

FIG. 7 is a flowchart depicting one embodiment of a first feature duplication method 700 suitable for a multi-user CAx editing environment. As depicted, the feature duplication method 700 includes creating 710 a feature that references an existing geometric element, retrieving 720 the label for the geometric element, and communicating 730 a descriptor to another device for the feature that incorporates the label for the geometric element.

Creating 710 a feature that references an existing geometric element may include detecting that the user has completed the creation of a feature within the model via the user interface to the CAx software. In one embodiment, the detection is accomplished by a synchronization module executing on a CAx editing client. For example, the synchronization module may be a plugin module or may be a module that is integral to the CAx editing client. In another embodiment, the detection is accomplished by a synchronization module residing on a collaborative server that detects changes to an operations log or the like.

Retrieving 720 the label for the geometric element may include querying a local instance of a model for the label that has been previously stored in an auxiliary field that is associated with a geometric element. Communicating 730 a descriptor to another device for the feature that incorporates the label for the geometric element may include compiling a feature descriptor that includes the feature type, the label(s) for the geometric element(s) involved or referenced, and sending the feature descriptor to another device. The feature descriptor preferably includes enough information for the other device to accurately recreate the feature.

Figure 8:
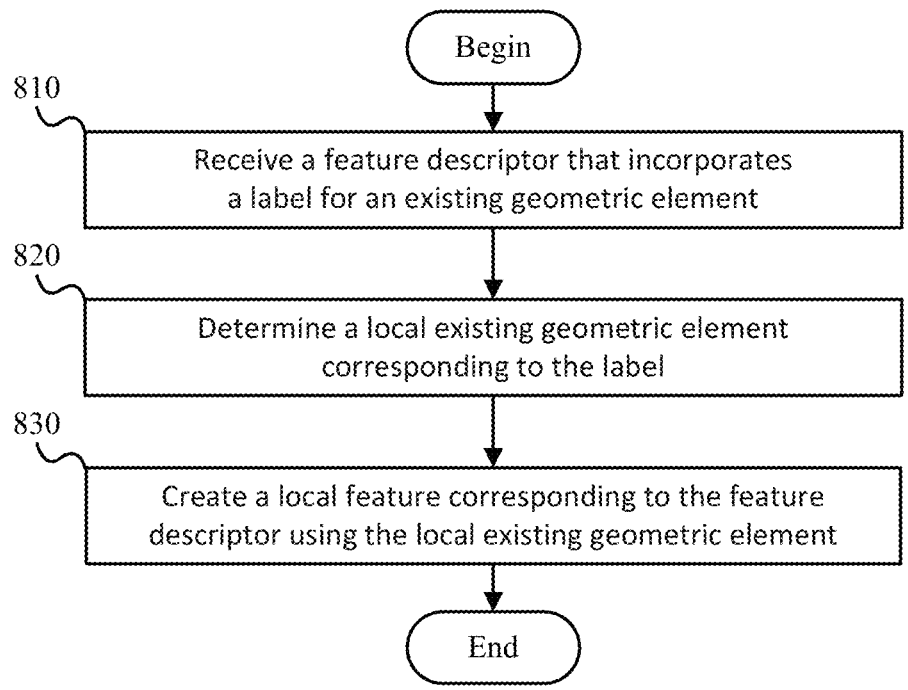

FIG. 8 is a flowchart depicting one embodiment of a second feature duplication method 800. As depicted, the feature duplication method 800 includes receiving 810 a feature descriptor that incorporates a label for an existing geometric element, determining 820 a local existing geometric element corresponding to the label, and creating 830 a local feature corresponding to the feature descriptor using the local existing geometric element. The feature duplication method 800 may be conducted in conjunction with the feature duplication method 700. For example, the client for a second user may execute the feature duplication method 800 in response to receiving a feature descriptor from a client executing the feature duplication method 700 in response to a first user creating or editing a feature that references an existing geometric element.

Receiving 810 a feature descriptor that incorporates a label for an existing geometric element may include receiving an electronic communication of a feature descriptor or the like that includes the unique persistent label(s) of any referenced geometric elements. In one embodiment, the communication is facilitated by a collaborative server. In another embodiment, the communication is managed by the respective clients.

Determining 820 a local existing geometric element corresponding to the label may include querying a local instance of an electronic model for a geometric element with a matching label, and thus obtaining a reference to the existing geometric element. Creating 830 a local feature corresponding to the feature descriptor using the local existing geometric element may include initiating creation of a feature of the type listed in the feature descriptor and providing the reference(s) to local existing geometric elements determined by the determining operation 820.

The various elements of the systems, methods, and apparatus described herein function cooperatively to manage editing conflicts, maintain data consistency and facilitate productive collaborative CAx editing. The preceding depictions are intended to be illustrative rather than definitive. Similarly, the claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computer-implemented method, executed by one or more processors, the computer-implemented method comprising:
    obtaining, via the one or more processors, a first globally unique identifier and one or more first distinguishing parameters for a geometric element responsive to creation of a first feature within a first instance of a model of an engineering object by a first concurrent user, the first instance represented in a first model format associated with a first CAx application;
    responsive to obtaining the first globally unique identifier and the one or more first distinguishing parameters, creating, via the one or more processors, a corresponding first feature on a second instance of the model, the second instance corresponding to a second concurrent user, the second instance represented in a second model format associated with a second CAx application not directly compatible with the first CAx application; and
    responsive to obtaining the first globally unique identifier and the one or more first distinguishing parameters, assigning, via the one or more processors, the first globally unique identifier to a corresponding geometric element of the corresponding first feature within the second instance of the model that has matching distinguishing parameters to the one or more first distinguishing parameters.

2. The computer-implemented method of claim 1, further comprising determining, via the one or more processors, which geometric element within the second instance of the model has matching distinguishing parameters.

3. The computer-implemented method of claim 1, wherein the first distinguishing parameters comprise one or more vertices or control points.

4. The computer-implemented method of claim 1, wherein the first distinguishing parameters comprise a feature identifier associated with the feature.

5. The computer-implemented method of claim 1, wherein the first globally unique identifier comprises a user name.

6. The computer-implemented method of claim 1, further comprising:
    obtaining, via the one or more processors, a second globally unique identifier and one or more second distinguishing parameters for a geometric element responsive to creation of a second feature within the second instance of the model of the engineering object by the second user, the second instance represented in the second model format associated with the second CAx application;
    responsive to obtaining the second globally unique identifier and the one or more second distinguishing parameters, creating, via the one or more processors, a corresponding second feature on the first instance of the model; and
    responsive to obtaining the second globally unique identifier and the one or more second distinguishing parameters, assigning, via the one or more processors, the second globally unique identifier to a corresponding geometric element of the corresponding second feature within the first instance of the model that has matching distinguishing parameters to the one or more second distinguishing parameters.

7. The method of claim 1, wherein at least the operation of assigning the first globally unique identifier to the corresponding geometric element within the second instance of the model is conducted by a software layer that is integral to a client computer itself.

8. A computer-implemented method, executed by one or more processors, the computer-implemented method comprising:
identifying, via the one or more processors, one or more first distinguishing parameters for a first geometric element created in response to creating a feature within a first instance of a model of an engineering object, the first instance represented in a first model format associated with a first CAx application;
responsive to identifying the one or more first distinguishing parameters, generating, via the one or more processors, a first globally unique identifier for the geometric element;
responsive to generating the first globally unique identifier, communicating, via the one or more processors, the first globally unique identifier and the first distinguishing parameters to a device corresponding to a second instance of the model of the engineering object the second instance corresponding to a second concurrent user, the second instance represented in a second model format associated with a second CAx application not directly compatible with the first CAx application;
responsive to communication of the first globally unique identifier and the one or more first distinguishing parameters, creating, via the one or more processors, a corresponding first feature within the second instance of the model of the engineering object; and
responsive to creating the corresponding first feature within the second instance of the model of the engineering object, assigning, via the one or more processors, the first globally unique identifier to a corresponding geometric element of the corresponding first feature in the second instance of the model of the engineering object that has matching distinguishing parameters to the one or more first distinguishing parameters.

9. The computer-implemented method of claim 8, wherein the first distinguishing parameters comprise one or more vertices or control points.

10. The computer-implemented method of claim 8, wherein the first distinguishing parameters comprise a feature identifier corresponding to the feature.

11. The computer-implemented method of claim 8, wherein the first globally unique identifier comprises a user name.

12. The computer-implemented method of claim 8, further comprising:
obtaining, via the one or more processors, a second globally unique identifier and one or more second distinguishing parameters for a geometric element in response to creation of a second feature within the second instance of the model of the engineering object by the second concurrent user, the second instance represented in the second model format associated with the second CAx application;
responsive to obtaining the second globally unique identifier and the one or more second distinguishing parameters, creating, via the one or more processors, a corresponding second feature on the first instance of the model; and
responsive to creating the corresponding second feature on the first instance of the model, assigning, via the one or more processors, the second globally unique identifier to a corresponding geometric element of the corresponding second feature within the first instance of the model that has matching distinguishing parameters to the one or more second distinguishing parameters.

13. A system comprising:
a plurality of editing clients comprising a first editing client and a second editing client, configured to concurrently edit a local instance of a model of an engineering object, the first editing client executing a first CAx application that uses a first CAx model format and the second editing client executing a second CAx application that uses a first CAx model format, wherein the second CAx application is not directly compatible with the first CAx application; and
wherein each of the plurality of editing clients comprise a synchronization module, comprising one or more processors and corresponding software for execution on the one or more processors, wherein the synchronization module of the first editing client is configured to identify one or more first distinguishing parameters for a first geometric element created in response to a local user creating a first feature within the local instance of the model, generate a first globally unique identifier for the geometric element, and communicate the first globally unique identifier and the first distinguishing parameters to the second editing client of the plurality of editing clients; and
wherein the synchronization module of the second editing client is configured to, responsive to communication of the first globally unique identifier and the first distinguishing parameters, create a corresponding feature within a second instance of the model of the engineering object, and assign the first globally unique identifier to a corresponding geometric element of the corresponding feature in the second instance of the model of the engineering object that has matching distinguishing parameters to the one or more first distinguishing parameters.

14. The system of claim 13, wherein the synchronization module is configured to obtain a second globally unique identifier and one or more second distinguishing parameters for a second geometric element responsive to creation of a second feature within another instance of a model of an engineering object by a remote concurrent user.

15. The system of claim 14, wherein the synchronization module is configured to create the second feature within a remote instance of the model corresponding to a remote concurrent user.

16. The system of claim 15, wherein the synchronization module is configured to assign the second globally unique identifier to a second geometric element within the local instance of the model that has distinguishing parameters that match the second distinguishing parameters.

17. The system of claim 13, wherein the first distinguishing parameters comprise one or more vertices or control points.

18. The system of claim 13, wherein the first distinguishing parameters comprise a first feature identifier associated with the first feature.

19. The system of claim 13, wherein the first globally unique identifier comprises a user name.

20. The system of claim 13, wherein at least the operation of assigning the first globally unique identifier to the corresponding geometric element within the second instance of the model is conducted by a software layer that is integral to a client computer itself.

* * * * *